(12) United States Patent
Takeshima et al.

(10) Patent No.: US 7,277,914 B2
(45) Date of Patent: Oct. 2, 2007

(54) PROXY SERVER APPARATUS AND METHOD FOR PROVIDING SERVICE USING THE SAME

(75) Inventors: Yoshiteru Takeshima, Yokohama (JP); Takashi Nishikado, Ebina (JP)

(73) Assignee: Hitachi, Ltd., Tokyo (JP)

( * ) Notice: Subject to any disclaimer, the term of this patent is extended or adjusted under 35 U.S.C. 154(b) by 772 days.

(21) Appl. No.: 10/233,564

(22) Filed: Sep. 4, 2002

(65) Prior Publication Data

US 2003/0236883 A1 Dec. 25, 2003

(30) Foreign Application Priority Data

Jun. 21, 2002 (JP) ............................ 2002-181705

(51) Int. Cl.
*G06F 15/13* (2006.01)
(52) U.S. Cl. ...................... 709/203; 709/224; 709/227; 709/236
(58) Field of Classification Search ................ 709/203, 709/224, 226, 227, 236
See application file for complete search history.

(56) References Cited

U.S. PATENT DOCUMENTS

| | | | |
|---|---|---|---|
| 6,490,620 B1 * | 12/2002 | Ditmer et al. | 709/224 |
| 2002/0010798 A1 | 1/2002 | Ben-Shaul et al. | |
| 2002/0052798 A1 | 5/2002 | Nishikado et al. | |
| 2003/0009583 A1 * | 1/2003 | Chan et al. | 709/236 |
| 2003/0187992 A1 * | 10/2003 | Steenfeldt et al. | 709/227 |
| 2003/0191801 A1 * | 10/2003 | Paul | 709/203 |

FOREIGN PATENT DOCUMENTS

| | | |
|---|---|---|
| JP | 11134264 | 5/1999 |
| JP | 2000-253053 A | 9/2000 |
| JP | 2002140309 | 5/2002 |
| WO | WO- 00/46679 | 8/2000 |

OTHER PUBLICATIONS

G. Tomlinson, et al "Extensible Proxy Services Framework", Jul. 13, 2000, pp. 4-20 and 41-43.
Internet Content Adaptation Protocol (ICAP), International Conference on Antennas and Propagation, Jul. 30, 2001, pp. 1-13.

(Continued)

*Primary Examiner*—Jinsong Hu
(74) *Attorney, Agent, or Firm*—Mattingly, Stanger, Malur & Brundidge, P.C.

(57) ABSTRACT

It is possible to control the data transfer between a proxy server apparatus and an application server that is connected to the proxy server apparatus. An value added service control command is added to an request message and/or the response data. In accordance with the value added service control command included in the request message, a first proxy server Ia controls whether it relays this request message directly to a destination and it relays this request message to the destination after transferring this request message to an application server 7 and applying the value added service. Further, based on the value added service control command which is included in the response data, the first proxy server Ia controls whether it relays this response data directly to a destination or it relays this response data to the destination after transferring this response data to the application server 7 and applying the value added service.

6 Claims, 13 Drawing Sheets

OTHER PUBLICATIONS

G. Tomlinson, et al "A Model for Open Pluggable Edge Services", IETF Standard Working Draft, Internet Engineering Task Form, IETF, Nov. 20, 2001, pp. 3-24.

J. Elson, ICAP the Internet Content Adaptation Protocol, IETF Standard Working Draft, Jun. 2001, pp. 3-26, 30-31, no date.

Internet Content Adaptation Protocol Oct. 2001, pp. 7-40.

Ari Luotonen, Web Proxy Servers (Web Infrastructure Series), Prentice Hall PTR; 1st edition (Dec. 1997).

"Being Appeared a New Technology for Accelerating High Function of Web Cache Becomes More Intelligent", vol. 48, p. 20, Nikkei Internet Technology, Japan, published Jun. 22, 2001, by Nikkei BP Ltd.

"Cache Server Appliance/Effective for Reducing a Load and High Speed: Difference Between a Renewal Method of Contents and Management a Plurality of Apparatuses", vol. 55, pp. 46-55, Nikkei Internet Technology, Japan, published Jan. 22, 2002, by Nikkei BP Ltd.

* cited by examiner

DATA CACHE UNIT 113

| 1131 | 1132 | 1133 | 1134 |
|---|---|---|---|
| IDENTIFICATION INFORMATION | SERVICE TYPE/ SERVER NAME | EXPIRATION DATE | RESPONSE DATA (WEB DATA) |
| *** | ***/ |  | ************** |
| *** | ***/ |  | ************** |
| *** | ***/ |  | ************** |
| ⋮ | ⋮ | ⋮ | ⋮ |

FIG.8

CONTROL COMMAND INTERPRETING UNIT 115

| EXECUTION OBJECT | POLICY MANAGEMENT | | | TRANSMISSION SOURCE CONDITION | | VALUE ADDED SERVICE | | |
|---|---|---|---|---|---|---|---|---|
| | RULE ID | PRIORITY | EXPIRATION DATE | IDENTIFICATION INFORMATION | USER ID | SERVICE TYPE | SERVER NAME | SCHEME |
| RESPONSE | 1 | 001 | — | 192.168.5.* | qp123 | FILTERING | AP1 | iCAP |
| RESPONSE | 2 | 002 | 2002/12/01 | 192.168.1.* | pw354 | VIRUS CHECK | AP3 | iCAP |
| RESPONSE | 3 | 003 | — | — | — | BANNER CUT | AP4 | iCAP |
| ......... | ...... | ...... | ...... | ...... | ...... | ...... | ...... | ...... |
| ACCESS | 1 | 001 | 2002/11/01 | 192.168.1.* | pw354 | VIRUS CHECK | AP2 | iCAP |
| ACCESS | 2 | 002 | — | 192.168.8.* | xz125 | FILTERING | AP2 | iCAP |
| ......... | ...... | ...... | ...... | ...... | ...... | ...... | ...... | ...... |

FIG.9

VALUE ADDED SERVICE CONTROL COMMAND 435, 644

```
< VALUE ADDED SERVICE CONTROL COMMAND >
   < POLICY MANAGING INFORMATION >
      < OBJECT TO BE EXECUTED > RESPONSE </ OBJECT TO BE EXECUTED >  ~1165
      < RULE ID > 1 </ RULE ID >  ~1166
      < PRIORITY > 001 </ PRIORITY >  ~1167
      < EXPIRATION DATE > - </ EXPIRATION DATE >  ~1168
   </ POLICY MANAGING INFORMATION >  ~1169
   < TRANSMISSION ORIGIN CONDITION >
      < IDENTIFICATION INFORMATION > **** </ IDENTIFICATION INFORMATION >  ~1170
      < USER ID > **** </ USER ID >
   </ TRANSMISSION ORIGIN CONDITION >
   < VALUE ADDED SERVICE INFORMATION >
      < SERVICE TYPE > RESPONSE MODIFICATION </ SERVICE TYPE >  ~1171
      < SERVER NAME > AP1 </ SERVER NAME >  ~1172
      < SCHEME > iCAP </ SCHEME >  ~1173
   </ VALUE ADDED SERVICE INFORMATION >
</ VALUE ADDED SERVICE CONTROL COMMAND >
```

1162, 1163, 1164 → 1161

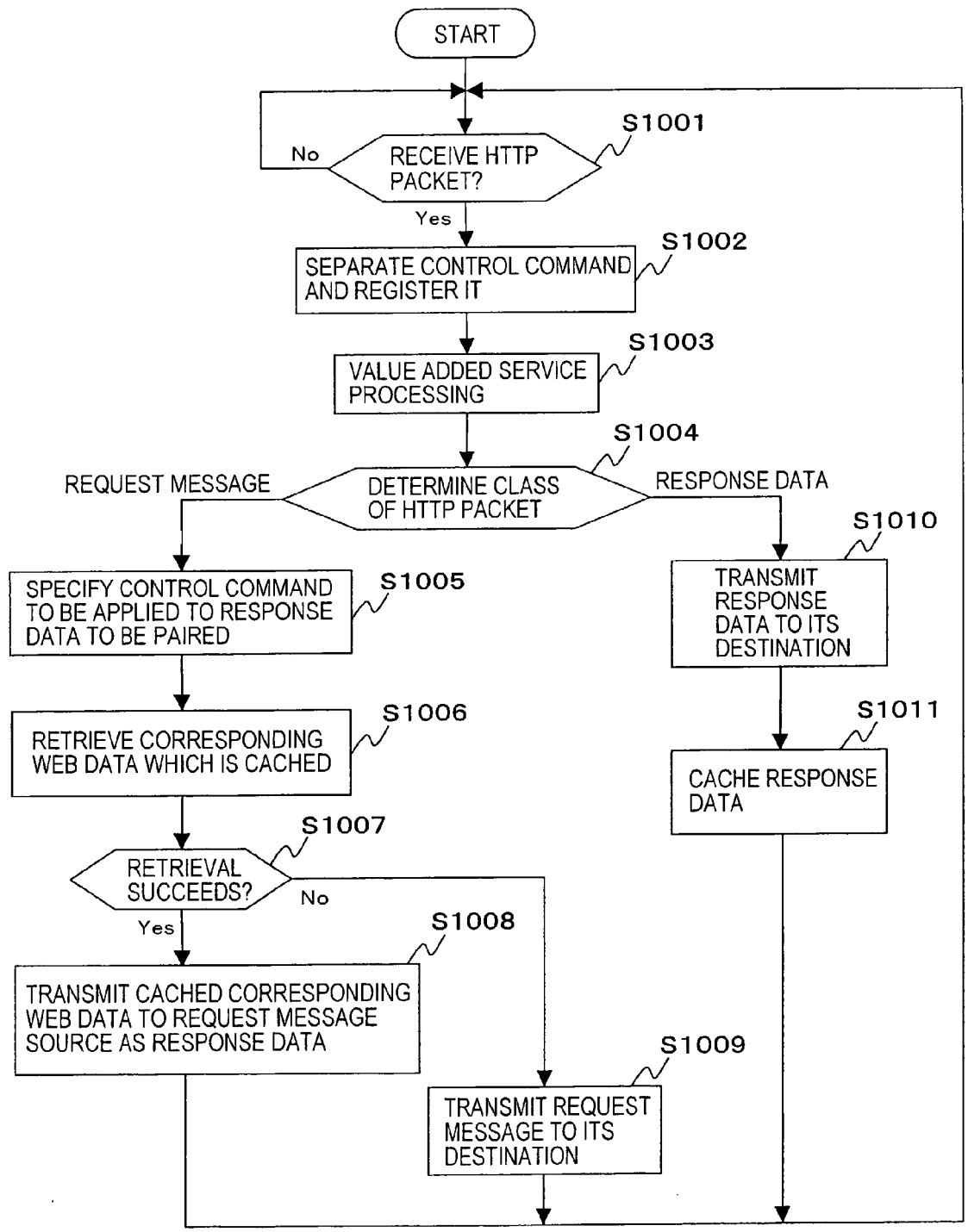

PROXY SERVER APPARATUS AND METHOD FOR PROVIDING SERVICE USING THE SAME

CROSS-REFERENCES TO RELATED APPLICATIONS

Background of the Invention

The present invention relates to a communication proxy technology for receiving a request message (an access request) from a client such as a Web browser and providing the response data such as Web data in place of an server such as a Web server.

In "Web proxy servers" issued in 1998 by Pearson Education (i.e. a translation of Ari Luotonen, "Web Proxy Servers" (Web Infrastructure Series), Prentice Hall PTR; 1st edition, December 1997), a communication proxy technology for speeding up the access to the Web data of the Web browser is described.

According to this technology, a proxy server is provided to receive the request message from the Web browser in place of the Web server, so that this proxy server relays the request message which is received from the Web browser to the Web server and relays the Web data (the response data) which is transmitted from this Web server in response to the request message to the Web browser.

At this time, the relayed Web data is cached in the proxy server. Then, if the Web browser requests the access to the Web data that is cached, the proxy server transmits this cached Web data to the Web browser as the response data in place of relaying the request message to the Web server.

In this way, it is possible to speed up the access to the Web data from the Web browser, and to prevent the server from being congested by access concentration.

Additionally, in 1999, a communication proxy technology capable of providing a value added service (an additional service) was suggested by iCAP (Internet Content Adaptation Protocol) forum.

According to this technology, a dedicated application server which is called an iCAP server is provided and this application server is connected to the proxy server by a communication protocol which is called iCAP. Further, this technology makes the proxy server transfer the request message and the response data to the iCAP server.

When a content of the request message and/or a content of the response data which was transmitted from the proxy server are modified, edited or converted into other data by the iCAP server, it is possible to provide the value added service other than high-speed of the access to the Web data.

By the way, according to the communication proxy technology using the above described iCAP, the protocol (iCAP) is only used for the communication between the proxy server and the iCAP server and it is taking nothing into consideration with respect to a control policy such as transfer conditions. The conditions are, for example, when and to which server the request or the response message to be transmitted.

For example, setting a table in which the control policy is registered for each URL (Uniform Resource Locator) in the proxy server in advance, it is also possible to make the proxy server process the request message based on a content of this table.

However, in this case, the above described table needs to be set up at each of many proxy servers which are located on a network, so that it is difficult. Particularly, in the case that necessity arises to change the control policy, the table that was set in each proxy server should be updated on each time.

Additionally, the control policy is applied for each URL, so that it is difficult to perform the delicate control such that different value added services are applied to each data item which is dynamically generated by a CGI (Common Gateway Interface). Further, it is necessary to look up the control policy to be applied from the table using the URL as a key. Since the number of the URL is enormous, it takes a long time till the process is started in accordance with the control policy.

In the international publication Number WO 00/46679, a technology is disclosed such that a control policy for controlling the internal processing of the proxy server is included in the response data and the internal processing in the proxy server is carried out based on the control policy. However, this technology relates to the processing control in the proxy server and it does not relate to the control of the data transfer between the proxy server and the application server.

SUMMARY OF THE INVENTION

The present invention provides a technology capable of controlling data transfer to application servers that connected to a proxy server apparatus.

According to the present invention, a request message from a client and/or a response data from a Web server includes a control command which indicates a condition and the application server to which the request message and/or its response data are to be transferred when the condition is satisfied. Then, the proxy server apparatus (referred to as a first proxy apparatus) receives the request message from the client in place of an server, transfers the request message to one of the application servers in accordance with the control command which is included in the request message to apply a value added service and relays the request message to the server. Or, based on the control command which is included in the response data, the first proxy apparatus transfers the response data to one of the application servers to apply a value added service and relays the response data to the client.

For example, the first proxy apparatus according to the present invention has the following constitution.

Namely, the first proxy apparatus according to the present invention comprises; a control command interpreting unit (a unit that parses control command) that separates a control command from a request message and/or response data and manages it when the request message and/or the response data have the control command which at least indicates an object to which an value added service is applied, a condition of applying the value added service and a content of the value added service;

an value added service control unit (unit that controls value added service) that decides the control command to be applied to the request message and/or its response data among the contents which are managed by the control command interpreting unit, transfers the request message and/or its response data to an application server for carrying out the value added service in accordance with the decided control command and obtains the processed request message and/or its processed response data to which the value added service has been applied from the application server; and an request message proxy unit (unit that relays request message) that receives the request message of the client to relay it to the server as the request message transmission destination and receives the response data of this request message from the server to relay this to said client as the request message transmission source.

In this case, the request message proxy unit makes the control command interpreting unit process the request message of the client to obtain the request message which does not include the control command, makes the value added service control unit process this request message to obtain the processed request message and relays this request message to the destination server and, the request message proxy unit makes the value added service control unit process the response data of the server to obtain the processed response data and relays this response data to the client.

According to the present invention, the request message includes the control command that indicates a condition and the application server to which the request message and/or its response data are to be transferred when the condition is satisfied. And, the first proxy server apparatus extracts the control command which is included in the request message and/or the response data to interpret it, and controls whether or not the request message and/or its response data should be transferred to the application server in accordance with this control command.

Therefore, there is no necessity that the table as described above is set in advance in each of proxy servers that are located on a network. Additionally, it is possible to provide the different value added services to each of data items which are dynamically generated by the CGI and has the same destination URL. In this way, according to the present invention, it is possible to control the data transfer to the application server flexibly and delicately.

In the present invention, a control command adding unit may be provided to the client or a proxy server apparatus (referred to as a second proxy apparatus) which is located at the client side than the first proxy apparatus. The control command adding unit adds the control command to the request message from the client to relay it to the first proxy apparatus.

In the same way, in the present invention, a control command adding unit may be provided to the server or a proxy server apparatus (referred to as a third proxy apparatus) which is located at the server side than the first proxy apparatus. The control command adding unit adds the control command to the response data from the server to relay it to the first proxy apparatus.

BRIEF DESCRIPTION OF THE DRAWINGS

FIG. 8 illustrates an example of a content that is registered in a control command interpreting unit 115 shown in FIG. 6;

FIG. 9 illustrates a data constitutional example of an value added service control command;

FIG. 10 is an operational flow view of a first proxy server 1a shown in FIG. 6;

DESCRIPTION OF THE PREFERRED EMBODIMENTS

An embodiment according to the present invention will be described below.

Figure 1:
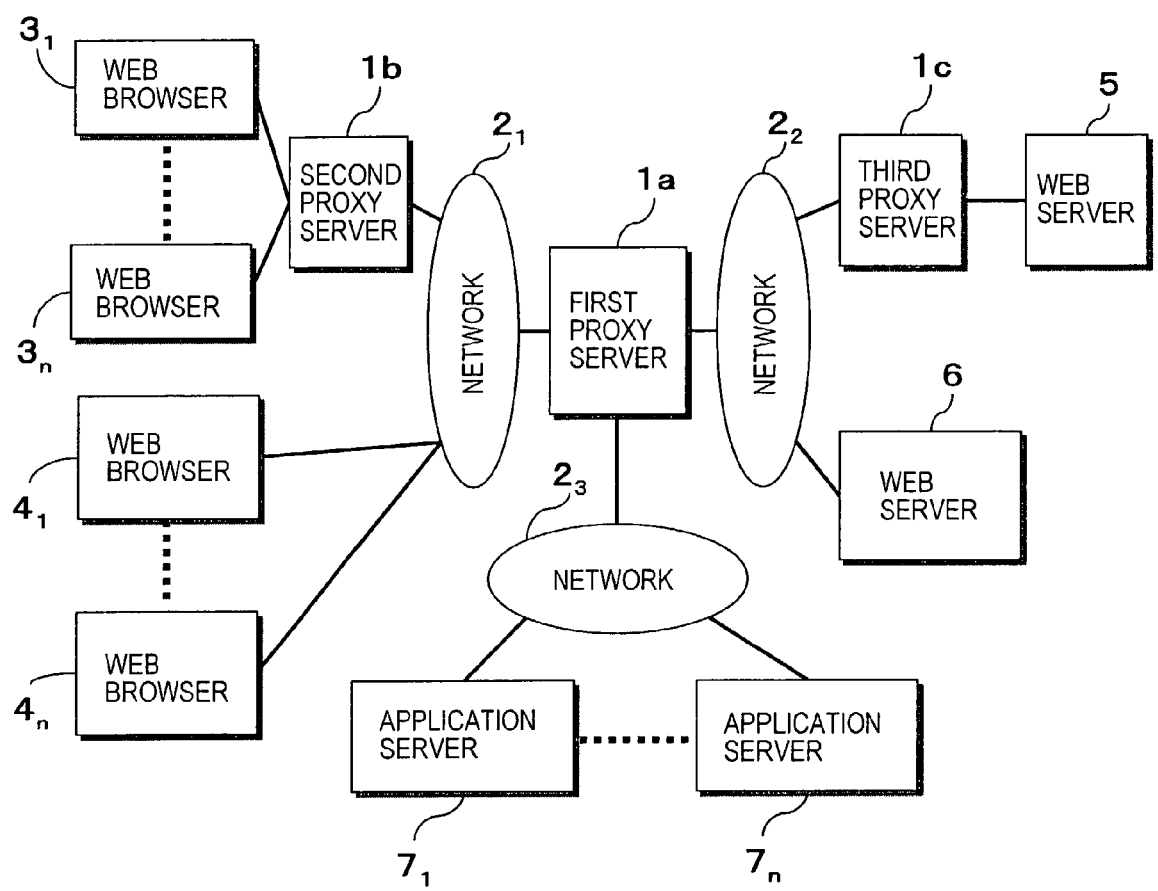
FIG. 1 is a block diagram for illustrating a schematic constitution of a network system to which a first embodiment of the present invention is applied.

FIG. 1 is a block diagram for illustrating a schematic constitution of a network system to which a first embodiment of the present invention is applied. In FIG. 1, data channels connecting respective devices comprise data channels. One data channel may be realized on a multiple physical communication lines via at least one rooter device. On the contrary, multiple data channels may be realized on one physical communication line. Further, networks $2_1$ to $2_3$ represent an aggregation of the data channel.

Web browsers $3_1$ to $3_n$ (also referred to as a Web browser 3) are connected to the network $2_1$ via a second proxy server 1b. As the Web browser 3, the existing Web browser device can be used as it is. Namely, the Web browser 3 has a function to generate a request message including identification information of the Web data a user wants to browse For example, according to the instruction by the user, the Web browser 3 transmit this request message to the second proxy server 1b, and receive response data (Web data) from the second proxy server 1b and display it on a screen.

A Web server 5 is connected to the network $2_2$ via a third proxy server 1c. As the Web server 5, the existing Web sever device can be used. Namely, the Web server 5 has a function to read Web data, which is indicated by a request message which was received from a third proxy server 1c, from a database and transmit this as response data to a transmission source of the request message via the third proxy server 1c.

Application servers $7_1$ to $7_n$ (also referred to as an application server 7) are connected to the first proxy server 1a via the network $2_3$. The application server 7 is a server device for making the proxy server provide the value added service such as (process, modification, conversion and check of the request message and the response data) other than speeding up access to Web data. For example, an iCAP server is employed for the application server 7. In this case, the iCAP is used for the communication between the first proxy server 1a and the application server 7.

Web browsers $4_1$ to $4_n$ (also referred to as a Web browser 4) are connected to the network $2_1$. In addition to the above described function provided to the Web browser 3 (i.e. a function provided to the existing Web browser), the Web browser 4 further has a function (i.e. an request message command adding function) to add an value added service control command which indicates the application server 7 and the value added service information to this request message and/or its response data.

Figure 2:
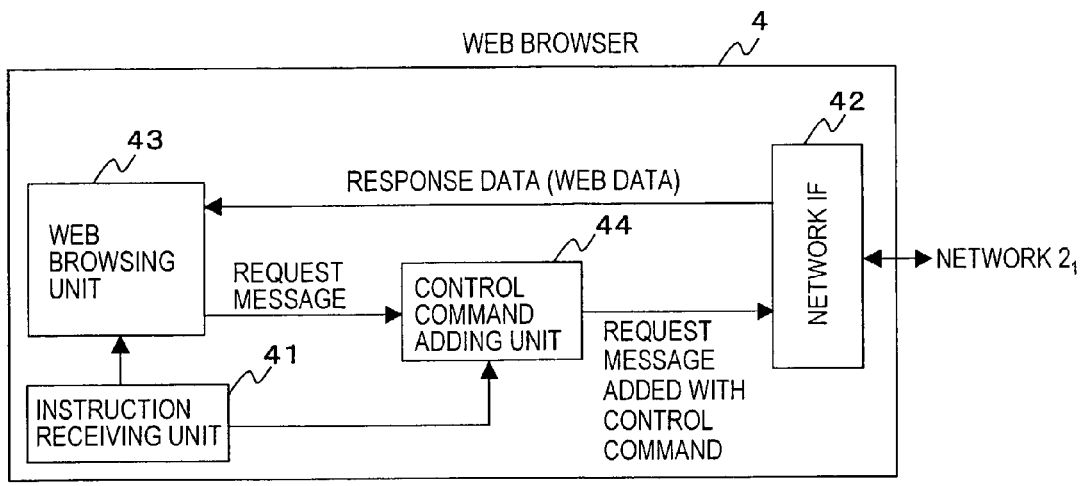
FIG. 2 is a block diagram for illustrating a schematic constitution of a Web browser 4 shown in FIG. 1.

FIG. 2 illustrates a schematic constitution of the Web browser 4.

As shown in FIG. 2, the Web browser 4 has an instruction receiving unit 41 for receiving the instruction by the user, a network IF (interface) 42 for communicating with the network $2_1$, a Web browsing unit 43 for generating the request message including the identification information of the Web data, for example, according to the instruction which is received by the instruction receiving unit 41 to output it and receiving the Web data as the response data to display it on a screen, and a control command adding unit 44.

The control command adding unit 44 adds the value added service control command for indicating the application server 7 to which the request message and/or its response data are to be transmitted and the value added service which is to be applied to the request message and/or its response data, to the request message outputted from the Web browsing unit 43 based on the instruction which was received by the instruction receiving unit 41 or a content which has been set in advance. As the content which has been set in advance, for example, it is considered that the value added service control command to be added is set in advance for each period of time of generating the request message.

Figure 3A:
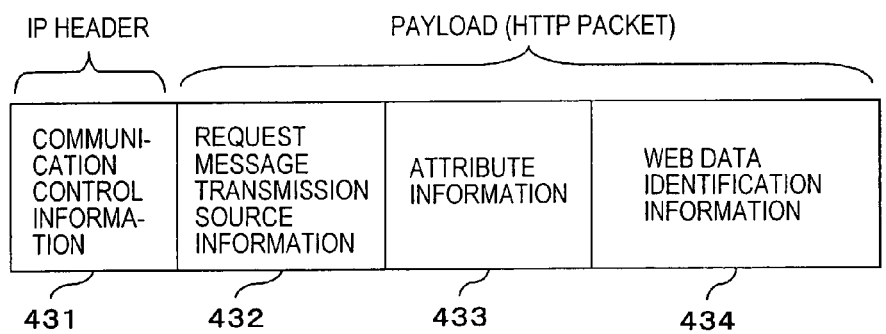
FIG. 3A illustrates a data constitutional example of an request message.
Figure 3B:
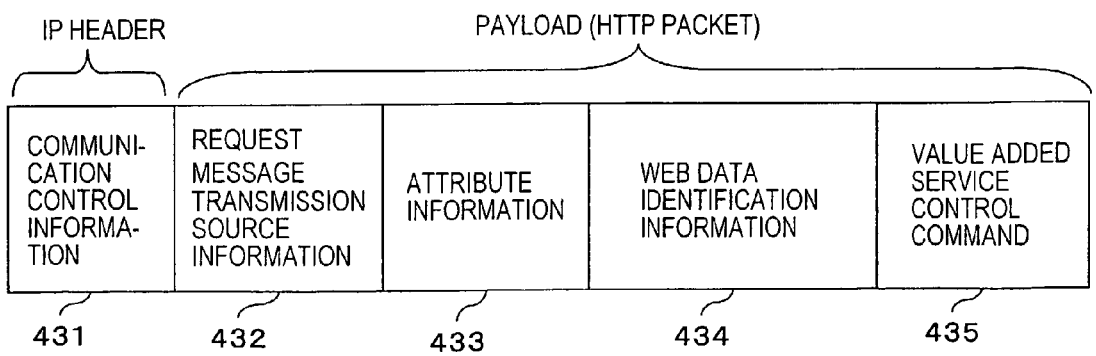
FIG. 3B illustrates a data constitutional example of an request message.

FIG. 3A illustrates a data constitutional example of the request message, to which the value added service control command is not added and FIG. 3B illustrates a data constitutional example of the request message, to which the value added service control command is added. As shown in FIGS. 3A, 3B, in an IP header of an IP packet showing the request message, the communication control information 431 including a transmission source IP address and a destination IP address of this IP packet is stored. An HTTP (Hypertext Transfer Protocol) packet is stored in the payload of this IP packet. In this HTTP packet, the request message transmission source information 432 including the identification information (i.e. the identification information on the HTTP) of the transmission source of this HTTP packet (i.e. the request message), and the certification information or the like for using the proxy server 1, the attribute information 433 showing that the HTTP packet is the request message and the identification information 434 of the Web data are stored. As shown in FIG. 3B, in the request message to which the value added service control command is added, the value added service control command 435 is further stored in this HTTP packet.

A Web server 6 is connected to the network $2_2$. In addition to the above described function provided to the Web browser 6 (i.e. a function provided to the existing Web browser), the Web server 6 further has a function (i.e. a response data command adding function) to add the value added service control command for indicating the application server 7 to which the response data is to be transmitted and the value added service which is to be applied to the response data to this response data.

Figure 4:
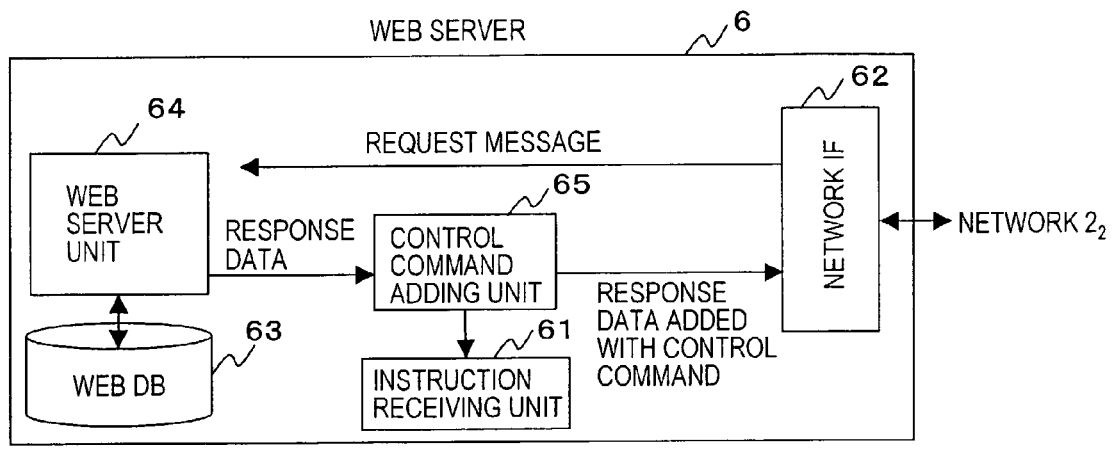
FIG. 4 is a block diagram for illustrating a schematic constitution of a Web browser 6 shown in FIG. 1.

FIG. 4 illustrates a schematic constitution of the Web browser 6.

As shown in FIG. 4, the Web server 6 has an instruction receiving unit 61 for receiving the instruction by the user, a network IF 62 for communicating with the network $2_2$, a Web DB (database) 63 for holding the Web data, a Web server unit 64 for reading the Web data from the Web DB 63 based on the request message to output it as the response data and a control command adding unit 65.

The control command adding unit 65 adds the value added service control command for indicating the application server 7 to which the response data to be transmitted and the value added service which is to be added to the response data, to the response data outputted from the Web server unit 64 based on the instruction which was received by the instruction receiving unit 61 or a content which has been set in advance to this response data. As the content which has been set in advance, for example, it is considered that the value added service control command to be added is set in advance for each period of time of generating the response data.

Figure 5A:
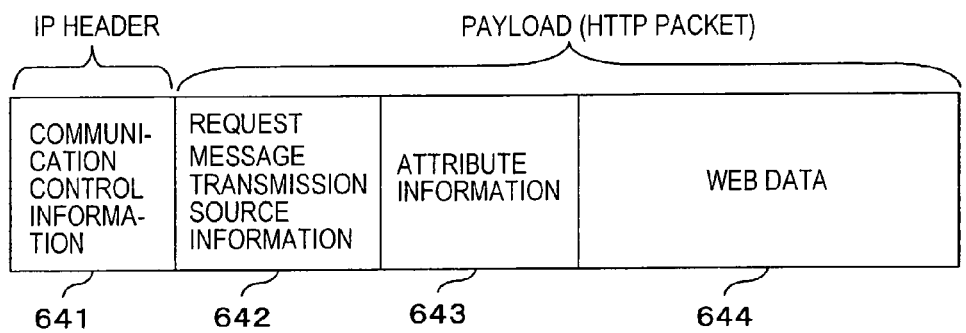
FIG. 5A illustrates a data constitutional example of the response data.
Figure 5B:
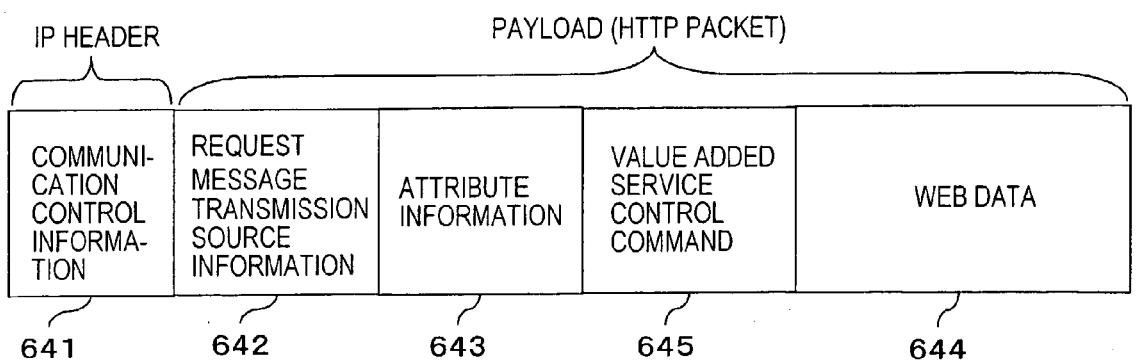
FIG. 5B illustrates a data constitutional example of the response data.

FIG. 5A illustrates a data constitutional example of the response data, to which the value added service control command is not added and FIG. 5B illustrates a data constitutional example of the response data, to which the value added service control command is added. As shown in FIG. 5A, FIG. 5B, in an IP header of an IP packet showing the response data, the communication control information 641 including a transmission source IP address and a destination IP address. In the payload of this IP packet, an HTTP (Hypertext Transfer Protocol) packet is stored. In this HTTP packet, the request message transmission source information 642 including the identification information (the identification information on the HTTP) of an request message transmission source and the certification information for using the proxy server 1, the attribute information 643 showing that this HTTP packet is the response data and the web data 644 are stored. As shown in FIG. 5B, according to the response data to which the value added service control command is added, an value added service control command 645 is further stored in this HTTP packet. The attribute information 643 also includes cache/uncache information, cache expiration date information and class (type) information of the Web data 644 or the like.

The first proxy server 1$a$ is connected to the network $2_1$, the network $2_2$ and the network $2_3$.

The first proxy server 1$a$ receives the request message of the Web data which is transmitted from the Web browsers 3,4 through the network $2_1$ and relays this request message to the Web servers 5, 6 and the first proxy server 1$a$ relays the Web data (the response data) which is transmitted from the transmission destination of this request message to the transmission source of the request message (a relay function) Additionally, the first proxy server 1$a$ caches the relayed Web data and then, if the request message of the cached Web data is transmitted from the Web browsers 3 and 4, the first proxy server 1$a$ transmits this cached Web data to the transmission origin of the request message as the response data of this request message instead of relaying the request message to the Web servers 5, 6, (a cache function) Further, the first proxy server 1$a$ transfers the request message and/or its response data to the application server 7 and relays it to the transmission destination after performing the value added service such as process, modification, conversion and check or the like at the application server 7 based on the value added service control command which is included in the request message and/or its response data (an value added service function).

Figures 6, 7:
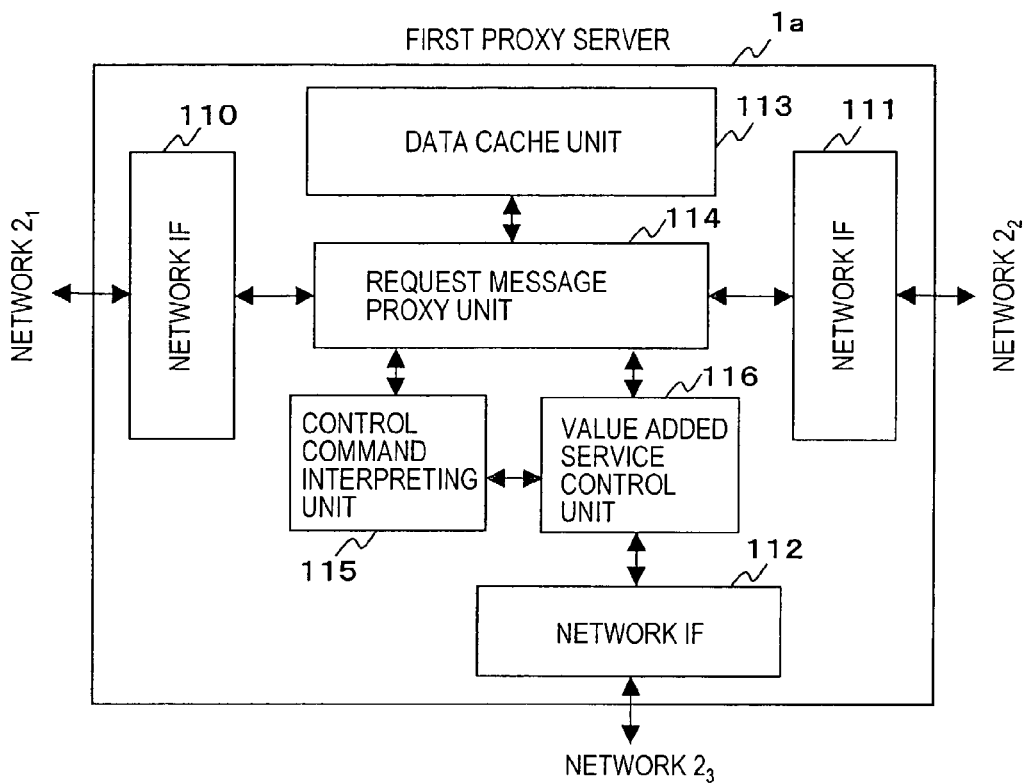
FIG. 6 is a block diagram for illustrating a schematic constitution of a first proxy server 1a shown in FIG. 1.
FIG. 7 illustrates an example of a content that is registered in a data cache unit 113 shown in FIG. 6.

FIG. 6 illustrates a schematic constitution of the first proxy server 1a.

As shown in FIG. 6, the first proxy server 1a has a network IF 110 for communicating with the network $2_1$, a network IF 111 communicating with the network $2_2$, network IF 112 for communicating with the network $2_3$, a data cache unit 113, an request message proxy unit 114, a control command interpreting unit 115 and an value added service control unit 116.

The network IF 110 receives an IP packet from the network $2_1$, extracts an HTTP packet (the request message) from its payload and passes it to the request message proxy unit 114. And, the network IF 110 receives an HTTP packet (the response data) from the request message proxy unit 114 stores it in an IP packet to and transmit the IP packet to the network $2_1$.

The network IF 111 receives an IP packet from the network $2_2$, extracts an HTTP packet (the response data) from its payload and passes it to the request message proxy unit 114. And, the network IF 111 receives an HTTP packet (the request message) from the request message proxy unit 114 and stores it in an IP packet to transmit the IP packet to the network $2_2$.

The network IF 112 receives a packet complying with a communication protocol (for example, iCAP) to be adopted by the network $2_3$ from this network $2_3$, extracts an HTTP packet from its payload and passes it to the request message proxy unit 114. And, the network IF 112 receives an HTTP packet from the request message proxy unit 114 and stores it in an packet complying with a communication protocol adopted by the network $2_3$ to transmits this packet to the network $2_3$.

In the data cache unit 113, the response data (the Web data) is stored by the request message proxy unit 114.

FIG. 7 illustrates an example of a content that is registered in the data cache unit 113. As shown in FIG. 7, the response data 1134 is registered in the data cache unit 113 with being associated with a Web data identification information 1131 such as URL which has been stored in the HTTP packet of this response data 1134, a service type/service name 132 showing a class (type) of the value added service and name of the application server 7 applying this value added service when the value added service is applied to this response data and an expiration date 1133.

The control command interpreting unit 115 receives an HTTP packet from the request message proxy unit 114 and checks whether or not the value added service control command (in the case of the request message, the value added service control command 435 shown in FIG. 3B and in the case of the response data, the value added service control command 644 shown in FIG. 5B) is stored in this HTTP packet. Then, if the value added service control command is stored, the control command interpreting unit 115 separates this from the HTTP packet. Then, the control command interpreting unit 115 registers the value added service control command 435 to manage it.

FIG. 8 illustrates an example of a content that is registered in the control command interpreting unit 115. As shown in FIG. 8, in the control command interpreting unit 115, a record consists of a policy managing information field 1151 for registering the policy managing information, a transmission source condition registering field 1152 for registering the condition of the request message transmission source and an value added service information registering field 1153 for registering the content of the value added service.

The policy managing information field 1151 includes a field 11511 for registering an execution object representing a class (type) of a control command (a control command to be applied to the request message or a control command to be applied to the response data), a field 11512 for registering a rule ID for identifying each of the control commands among the control commands (execution) having the same objects, a filed 11513 for registering a priority (a order to be applied) of the control command among the control commands having the same object and a field 11514 for registering an expiration date of the control command.

The transmission source condition registering field 11512 includes fields 11521 and 11522 for registering the identification information and the User ID which are included in the request message transmission source information.

Then, the value added service information registering field 1153 includes a field 11531 for registering a service type showing a class and a type of the value added service to be applied to the request message and/or the response data, a field 11532 for registering an application server name for identifying application servers $7_1$ to $7_n$ which apply the value added services in liaison with the first proxy server 1a and a field 11533 for registering a scheme representing a protocol to be used for a communication with the application servers $7_1$ to $7_n$ which apply the value added services in liaison with the first proxy server 1a.

For example, in FIG. 8, the control command registered in a first record 1154 is an execution object "the response data", the priority "001" and the expiration date "none". In the case that the request message transmission source information stored in the target HTTP packet satisfies the request message transmission source condition stored in the transmission source condition registering field 1152 and this HTTP packet is the response data, the control command registered in this record 1154 (i.e. the service type "filtering", the server name "AP1" and the scheme "iCAP") is applied preferentially.

A data constitutional example of the value added service control command (refer to FIG. 3B and FIG. 5B) to be added to the request message and the response data will be explained below. FIG. 9 illustrates a data constitutional example of the value added service control command. In the example of FIG. 9, the value added service control command is shown by a tag system that is used in XML (Extensible Markup Language) or the like.

The area circled by a tag 1161 represents a content of the value added service control command. The tag 1161 includes a tag 1162, a tag 1163 and a tag 1164.

The area circled by a tag 1162 represents the policy managing information. The tag 1162 includes a tag 1165 for storing the execution object, a tag 1166 for storing the rule ID, a tag 1167 for storing the priority and a tag 1168 for storing the expiration date.

The area circled by the tag 1163 represents the request message transmission source condition. The tag 1163 includes a tag 1169 and a tag 1170 for storing the identification information and the user ID of the request message transmission source.

Further, the area circled by a tag 1164 represents the value added service information. The tag 1164 includes a tag 1171 for storing the service type, a tag 1172 for storing the application server name and a tag 1173 for storing the scheme.

Returning to FIG. 6, the explanation of the first proxy server 1a will be continued. The value added service control unit 116 decides the value added service control command to be applied to the HTTP packet which is received from the request message proxy unit 114 with reference to the control command interpreting unit 115 and transmits this HTTP packet to the application server 7 based on the selected value added service control command to apply the value added service. Then, the value added service control unit 116 returns the HTTP packet to which the value added service is applied to the request message proxy unit 114. On the other hand, in the case that there is no value added service control command to be applied, the value added service control unit 116 returns the HTTP packet which is received from the request message proxy unit 114 as it is.

The request message proxy unit 114 applies the value added service specified by the value added service control command to the request message (HTTP packet) received from the network $2_1$ via the network IF 110 by the use of the value added service control unit 116 when necessity arises. Then, the request message proxy unit 114 relays this request message to the transmission destination. On this occasion, if the Web data as the object of the request message is cached in the data cache unit 113, in stead of relaying the request message to the transmission destination, the request message proxy unit 114 reads this Web data and transmits it to the request message transmission source as the response data to the request message.

The request message proxy unit 114 applies the value added service specified by the value added service control command to the response data (HTTP packet) received from the network $2_2$ via the network IF 111 by the use of the value added service control unit 116 when necessity arises. Then, the request message proxy unit 114 relays this response data to the transmission destination. On this occasion, the Web data included in this response data is cached in the data cache unit 113.

FIG. 10 shows an operational flow of the first proxy server 1a.

At first, when the request message proxy unit 114 receives the HTTP packet from the network IF 110 and 111 (S1001) and then, the request message proxy unit 114 passes this HTTP packet to the control command interpreting unit 115. The control command interpreting unit 115 checks whether or not the value added service control command is stored in the HTTP packet received from the request message proxy unit 114. If the value added service control command is stored in the received HTTP packet, the control command interpreting unit 115 separates it from the HTTP packet. Then, the control command interpreting unit 115 registers the value added service control command 435 to manage this (S1002). Further, the control command interpreting unit 115 returns the HTTP packet from which the value added service control command is separated to the request message proxy unit 114. In the case that the value added service control command is not stored in the HTTP packet, the control command interpreting unit 115 returns the HTTP packet to the request message proxy unit 114 without doing any operation.

Next, the request message proxy unit 114 passes the HTTP packet received from the control command interpreting unit 115 to the value added service control unit 116. The value added service control unit 116 checks the request message transmission source information (refer to FIG. 3B and FIG. 5B) stored in the HTTP packet received from the request message proxy unit 114. Then, the value added service control unit 116 retrieves the value added service control command, whose execution object satisfies a class (type) of this HTTP packet (request message/response data), whose request message transmission source condition is satisfied by the request message transmission source information thus checked and further, which is not expired, among the value added service control commands which are held in the control command interpreting unit 115. Then, the value added service control unit 116 selects the detected value added service control command as the value added service control command to be applied to this HTTP packet. In this case, if there are some detected value added service control commands, the value added service control unit 116 selects the value added service control command having the highest priority among them as that to be applied to the HTTP packet.

When the value added service control command to be applied to this HTTP packet is selected in this way, the value added service control unit 116 communicates with the application server 7 specified by the application server name which is included in this value added service control command by the use of a communication protocol specified by the scheme which is included in this value added service control command and transmits the data of the HTTP packet which is received from the request message proxy unit 114, and requests for the value added service specified by the service type which is included in this value added service control command. Then, the value added service control unit 116 receives result of the value added service and returns it to the request message proxy unit 114. On this occasion, if the HTTP packet is the response data, the value added service control unit 116 notifies the request message proxy unit 114 of the service type of the applied value added service and the name of the application server together with the HTTP packet. On the other hand, in the case that there is no value added service control command to be applied, the value added service control unit 116 returns the HTTP packet which is received from the request message proxy unit 114 without doing any operation (S1003).

Next, when the request message proxy unit 113 receives the HTTP packet from the value added service control unit 116, the request message proxy unit 114 checks the class (request message/response data) of this packet (S1004).

As a result, if it is found that the HTTP packet is the request message the request message proxy unit 114 with reference to the control command interpreting unit 115 retrieves the value added service control command whose execution object is "the response data", whose request message transmission source condition is satisfied by the request message transmission source information included in this request message and further, which is not expired. Then, the request message proxy unit 114 decides this value added service control command as the value added service control command to be applied to the response data to this request message. If there are some of the detected value added service control commands, the request message proxy unit 114 selects the value added service control command having the highest priority among them as that to be applied to the response data of this request message (S1005).

When the value added service control command to be applied to the response data of the request message is decided in this way, the request message proxy unit 114 retrieves the Web data which is registered in the data cache unit 113 as associating it with the Web data identification information included in this request message and the service type and the application server name which are included in this value added service control command. On the other hand, in the case that there is no value added service control command to be applied to the response data of the request message, the request message proxy unit 114 retrieves the Web data which is registered in the data cache unit 113 as associating it with the Web data identification information included in this request message and the service type as blank (none) and the application server name as a blank (none) (S1006).

If the request message proxy unit 114 has been able to detect such Web data (S1007), it transmits this Web data to the request message transmission source via the network IF 110 as the response data to the request message (S1008). On the other hand, if the request message proxy unit 114 has not been able to detect such Web data (S1007), it transmits this request message to the Web server 6 which holds the Web data as the object of the request message or the third proxy server 1c which accommodates the Web server 5 which holds the Web data as the object of the request message via the network IF 111 (S1009).

On the other hand, in the case that the HTTP packet is the response data in S1004, the request message proxy unit 114 transmits this response data to the Web browser 4 specified by the request message source information which is included in the response data or the third proxy server 1b which accommodates the Web browser 3 specified by the request message source information which is included in the response data via the network IF 110 (S1010).

Then, the request message proxy unit 114 registers the Web data included in the response data in the data cache unit 113 by associating it with the Web data identification information which is included in this response data (S1011). On this occasion, if the request message proxy unit 114 receives the service type and the application server name together with the response data from the value added service control unit 116, the request message proxy unit 114 also registers these in the data cache unit 113 by associating them with the Web data.

Returning to FIG. 1, the explanation of the second proxy server 1b will be continued. The second proxy server 1b is connected to the network 2₁ and the Web browser 3. The second proxy server 1b further has the above described request message command adding function in addition to the above described relaying function and cache function.

Figure 11:
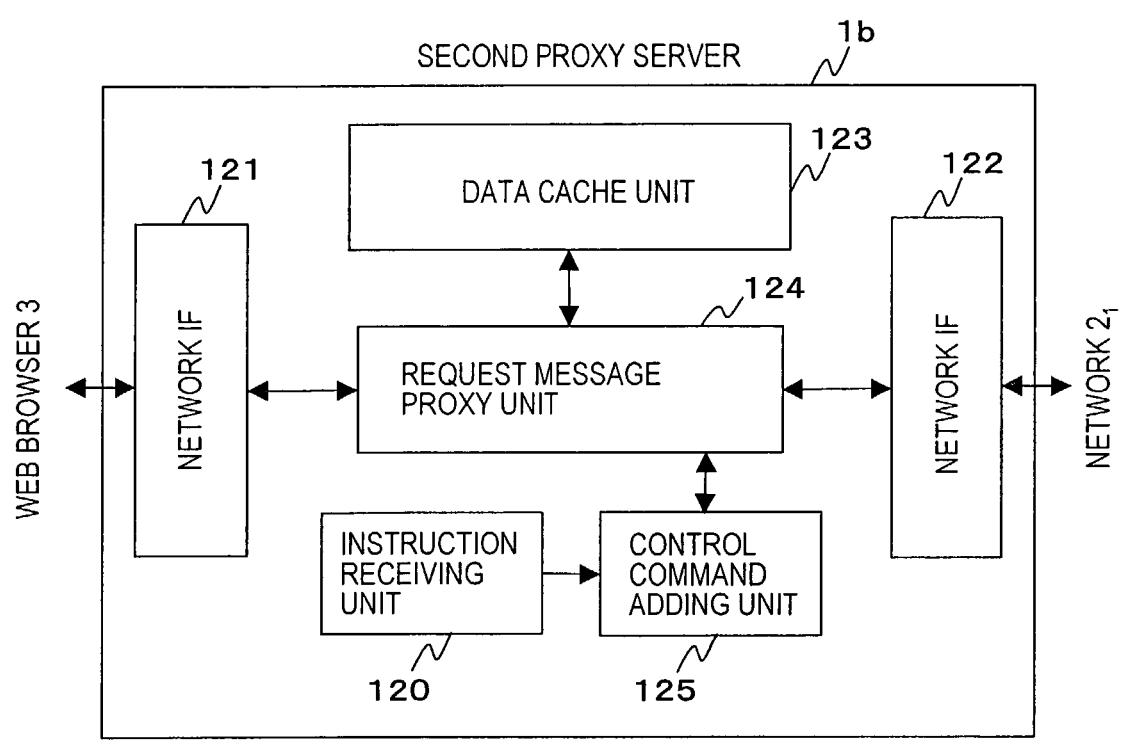
FIG. 11 is a block diagram for illustrating a schematic constitution of a second proxy server 1b shown in FIG. 1.

FIG. 11 illustrates a schematic constitution of the second proxy server 1b.

As shown in FIG. 11, the second proxy server 1b has an instruction receiving unit 120 for receiving the instructions by the user, a network IF 121 communicating with the Web browser 3, a network IF 122 communicating with the network 2₁, a data cache unit 123, an request message proxy unit 124 and a control command adding unit 125.

The network IF 121 receives the IP packet from the Web browser 3, extracts the HTTP packet (the request message) from its payload and passes this HTTP packet to the request message proxy unit 124. Further, the network IF 121 receives the HTTP packet (the response data) from the request message proxy unit 124, stores it in the IP packet and transmits it to the Web browser 3.

The network IF 122 receives the IP packet from the network 2₁, extracts the HTTP packet (the response data) from its payload and passes this HTTP packet to the request message proxy unit 124. Further, the network IF 122 receives the HTTP packet (the request message) from the request message proxy unit 124, stores it in the IP packet and transmits it to the network 2₁.

In the data cache unit 123, the response data (the Web data) is stored by the request message proxy unit 124. A content registered in the data cache unit 123 is basically the same as the example of a content that is registered in the data cache unit 113 shown in FIG. 7.

The control command adding unit 125 adds the value added service control command which indicates the application server 7 to which the request message and/or its response data are to be transmitted and the value added service which is to be applied to the request message and/or its response data to this request message outputted from the Web browser 3 in accordance with the instruction received by the instruction receiving unit 120 or a content set in advance. As the content set in advance, for example, it is considered that the value added service control command to be added is set in advance for each period of time of receiving the request message.

The request message proxy unit 124 adds the value added service control command to the request message (HTTP packet) received from the Web browser 3 via the network IF 121 in liaison with the control command adding unit when necessity arises. Then, the request message proxy unit 124 relays this request message to the first proxy server 1a via the network IF unit 122. On this occasion, if the Web data as the object of the request message is cached in the data cache unit 123, in stead of relaying the request message to the transmission destination thereof, the request message proxy unit 124 reads this Web data and transmits it to the request message transmission source as the response data of the request message.

Additionally, the request message proxy unit 124 relays the response data (HTTP packet) received from the network 2₁ to the transmission destination via the network IF unit 122. On this occasion, the request message proxy unit 124 caches the Web data included in this response data in the data cache unit 123.

Figure 12:
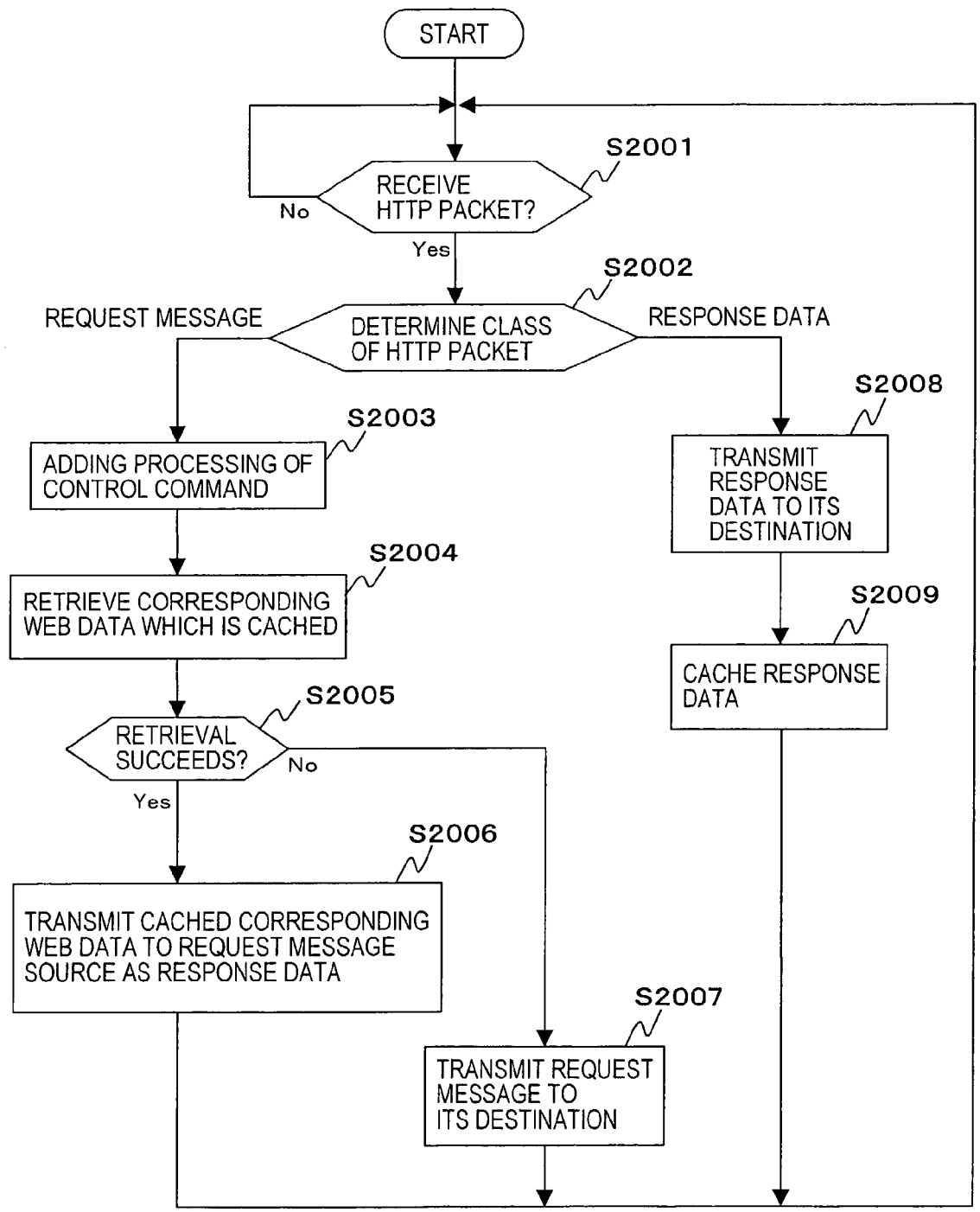
FIG. 12 is an operational flow chart of a second proxy server 1b shown in FIG. 11.

FIG. 12 shows an operational flow view of the second proxy server 1b.

At first, when the request message proxy unit 124 receives the HTTP packet from the network IF 121 and 122 (S2001) and then, it checks the type (request message/response data) of this packet (S2002).

As a result, if it is found that the HTTP packet is the request message, the request message proxy unit 124 passes this HTTP packet to the control command adding unit 125. The control command adding unit 125 adds the value added service control command to the request message which is received from the request message proxy unit 124 based on the instruction received by the instruction receiving unit 61 and a content which set in advance. Then, the control command adding unit 125 returns this request message to the request message proxy unit 124 (S2003).

Next, when the request message proxy unit 124 receives the request message from the control command adding unit 125, the request message proxy unit 124 checks whether or not the value added service control command whose execution object "the response data" is added to this request message. If the value added service control command whose execution object "the response data" is added, the request message proxy unit 124 retrieves the Web data registered in the data cache unit 123 by associating it with the Web data identification information included in this request message and the service type and the application server name which are included in this value added service control command added to this request message. On the other hand, in the case that no value added service control command whose execution object "the response data" is not added to this request message, the request message proxy unit 124 retrieves the Web data which is registered in the data cache unit 123 by associating it with the Web data identification information included in this request message and the service type as a blank (none) and the application server name of as a blank (none) (S2004).

If the request message proxy unit 124 has been able to detect such Web data (S2005), it transmits this Web data to the request message transmission source (i.e. the Web browser 3) via the network IF 121 as the response data of the request message (S2006). On the other hand, if the request message proxy unit 124 has not been able to detect such Web data (S2005), it transmits this request message to the first proxy server 1a via the network IF 122 (S2007) On this occasion, in the case that the value added service control command whose execution object "the response data" is added to this request message, the request message proxy unit 124 holds the service type and the application server name which are included in this value added service control command and the identification information of this request message till the response data of this request message is transmitted.

On the other hand, in S2002, if the HTTP packet is the response data, the request message proxy unit 124 transmits this response data to the Web browser 2 specified by the request message source information included in the response data via the network IF 121 (S2008).

Then, the request message proxy unit 124 registers the Web data included in the response data in the data cache unit 123 The Web data is associated with the Web data identification information which is included in this response data (S2009). On this occasion, if the service type and the application server name are held by being associated with the identification information of the request message paired with this response data, the request message proxy unit 124 also registers these associated with the Web data in the data cache unit 123.

Returning to FIG. 1, the explanation of the third proxy server 1c will be continued. The third proxy server 1c is connected to the network $2_2$ and the Web server 5. The third proxy server 1c further has the above described response data command adding function in addition to the above described relaying function and cache function.

Figure 13:
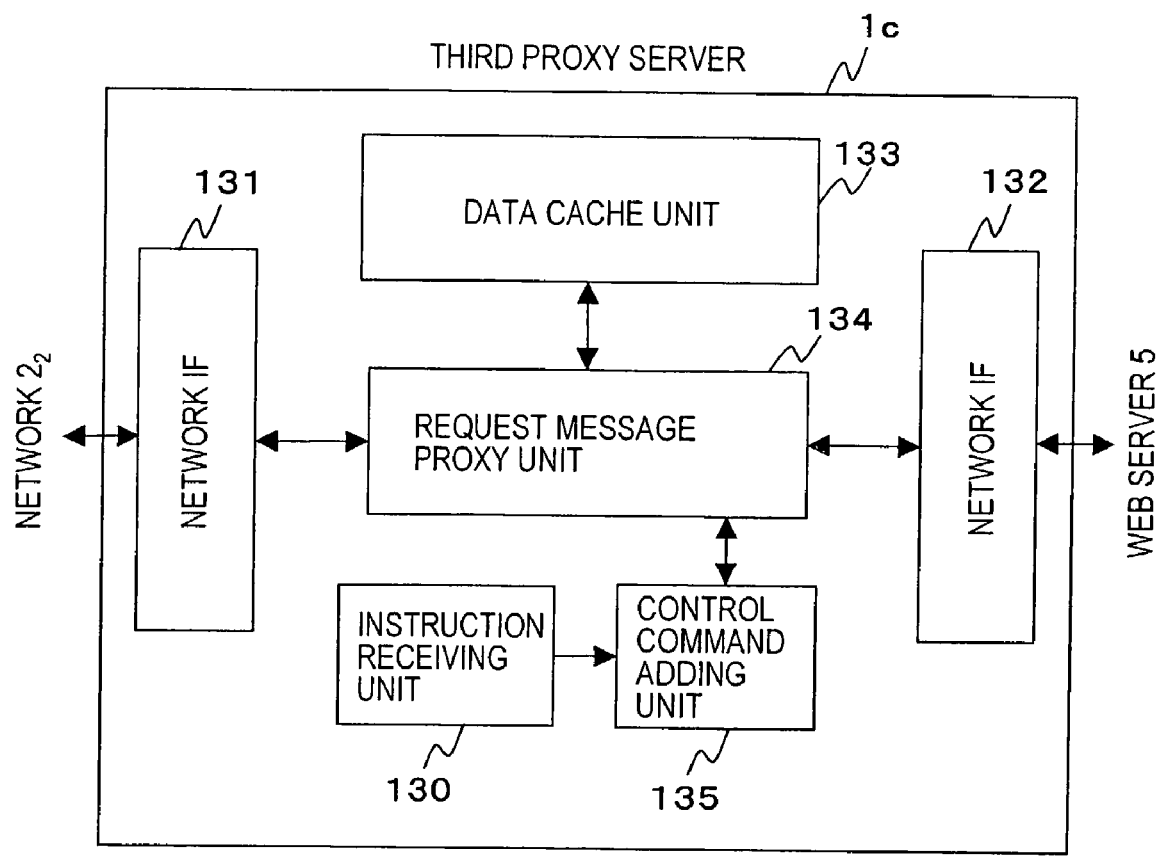
FIG. 13 is a block diagram for illustrating a schematic constitution of a third proxy server 1c shown in FIG. 1.

FIG. 13 illustrates a schematic constitution of the third proxy server 1c.

As shown in FIG. 13, the third proxy server 1c has an instruction receiving unit 130 for receiving the instructions by the user, a network IF 131 communicating with the network $2_2$, a network IF 132 communicating with the Web server 5, a data cache unit 133, an request message proxy unit 134 and a control command adding unit 135.

The network IF 131 receives the IP packet from the network $2_2$, extracts the HTTP packet (the request message) from its payload and passes this HTTP packet to the request message proxy unit 134. Further, the network IF 131 receives the HTTP packet (the response data) from the request message proxy unit 134, stores it in the IP packet and transmits it to the network $2_2$.

The network IF 132 receives the IP packet from the Web server 5, extracts the HTTP packet (the response data) from its payload and passes this HTTP packet to the request message proxy unit 134. Further, the network IF 132 receives the HTTP packet (the request message) from the request message proxy unit 134, stores it in the IP packet and transmits it to the Web server 5.

The response data (the Web data) is stored in the data cache unit 133 by the request message proxy unit 134. A content registered in the data cache unit 133 is basically the same as an example of the content registered in a data cache unit 113 shown in FIG. 7 except for the field 1132 for registering the service type and the application server name being omitted.

The control command adding unit 135 adds the value added service control command which indicates the application server 7 to which response data outputted from the web server 5 and/or response data storing the web data cached in data cache unit 133 and the value added service which is to be applied to these response data items to these response data items based on the instruction received by the instruction receiving unit 61 and a content which has been set in advance. As the content set in advance, for example, it is considered that the value added service control command to be added is set in advance for each period of time of receiving and generating the response data.

The request message proxy unit 134 relays this request message (the HTTP packet) received from the network $2_2$ via the network IF 131 to the Web server 5 via the network IF unit 132. On this occasion, if the Web data as the object of the request message is cached in the data cache unit 133, in stead of relaying the request message to the transmission destination thereof, the request message proxy unit 134 reads this Web data as the response data of the request message. The request message proxy unit 134 adds the value added service control command to this response data in liaison with the control command adding unit 135 when necessity arises. Then the request message proxy unit 134 transmits this response data of the request message transmission source.

Additionally, the request message proxy unit 134 adds the value added service control command to the response data (HTTP packet) received from the Web server 5 via the network IF unit 132 in liaison with the control command adding unit 135 when necessity arises. Then the request message proxy unit 134 transmits this response data to the request message transmission source. On this occasion, the request message proxy unit 134 caches the Web data included in this response data in the data cache unit 133.

Figure 14:
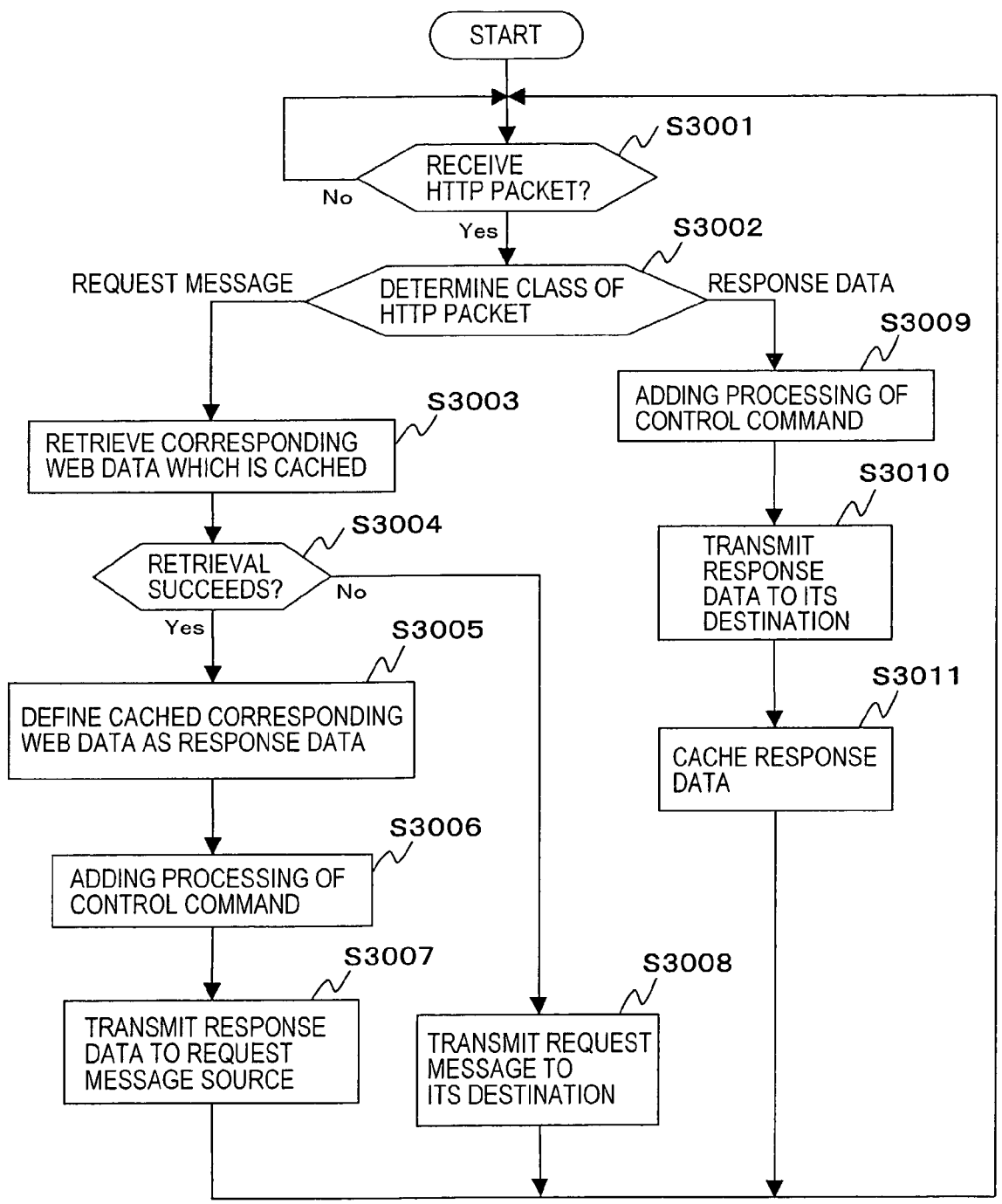
FIG. 14 is an operational flow chart of a third proxy server 1c shown in FIG. 13.

FIG. 14 shows an operational flow view of the third proxy server 1c.

At first, the request message proxy unit 134 receives the HTTP packet from the network IF 131 and 132 (S3001) and then, it checks a type (request message/response data) of this packet (S3002).

As a result, if it is found that the HTTP packet is the request message, the request message proxy unit 134 retrieves the Web data registered in the data cache unit 133 by associating it with the Web data identification information included in this request message (S3003).

If the request message proxy unit 134 has been able to detect such Web data (S3004), this Web data is handled as the response data of the request message (S3005) Then, the request message proxy unit 134 passes this response data to the control command adding unit 135. The control command adding unit 135 adds the value added service control command to the response data received from the request message proxy unit 134 in accordance with the instruction received by the instruction receiving unit 130 or a content set in advance when necessity arises. Then, the control command adding unit 135 returns this response data to the request message proxy unit 134 (S3006). The request message proxy unit 134 transmits this response data to the first proxy server 1a via the network IF 131 (S3007). On the other hand, if the request message proxy unit 134 has not been able to detect such Web data (S3004), it transmits this request message to the Web server 5 via the network IF 132 (S3008).

On the other hand, in S3002, if the HTTP packet is the response data, the request message proxy unit 134 passes this response data to the control command adding unit 135.

The control command adding unit 135 adds the value added service control command to the response data received from the request message proxy unit 134 based on the instruction received by the instruction receiving unit 130 and a content set in advance when necessity arises. Then, the control command adding unit 135 returns this response data to the request message proxy unit 134 (S3009). The request message proxy unit 134 transmits this response data to the first proxy server 1a via the network IF 131 (S3010). On this occasion, the request message proxy unit 134 registers the Web data included in this response data in the data cache unit 133. The Web data is associated with the Web data identification information included in this response data (S3011).

Figure 15:
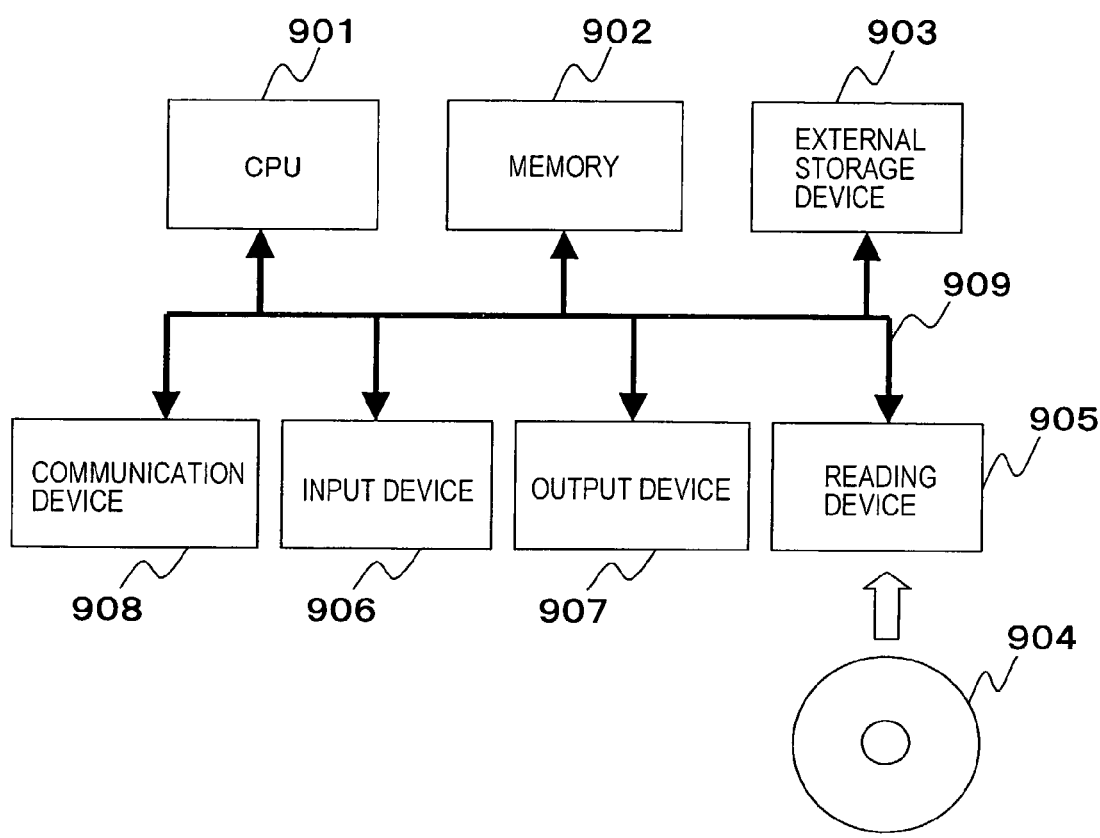
FIG. 15 illustrates a hardware constitutional example of respective devices which constitute a network system shown in FIG. 1.

By the way, respective devices shown in FIG. 1 can be realized in a general computer system which is provided with, for example, a CPU 901, a memory 902, an external storage device 903 such as an HDD or the like, a reading device 905 for reading the information from a storage medium 904 such as a CD-ROM and a DVD-ROM or the like, an input device 906 such as a key board and a mouse or the like, an output device 907 such as a display or the like and a communication device 908 for communicating with a communicating party's device via a network shown in FIG. 15 when the CPU 901 executes a predetermined program which is loaded on the memory 902.

Next, a flow of the request message and the response data which are exchanged on the network system constituted as described above will be explained below as taking a case such that the Web browser 3 accesses the Web data held by the Web server 5 and virus check is carried out for the request message and its response data, respectively, as the value added service as an example.

Figure 16:
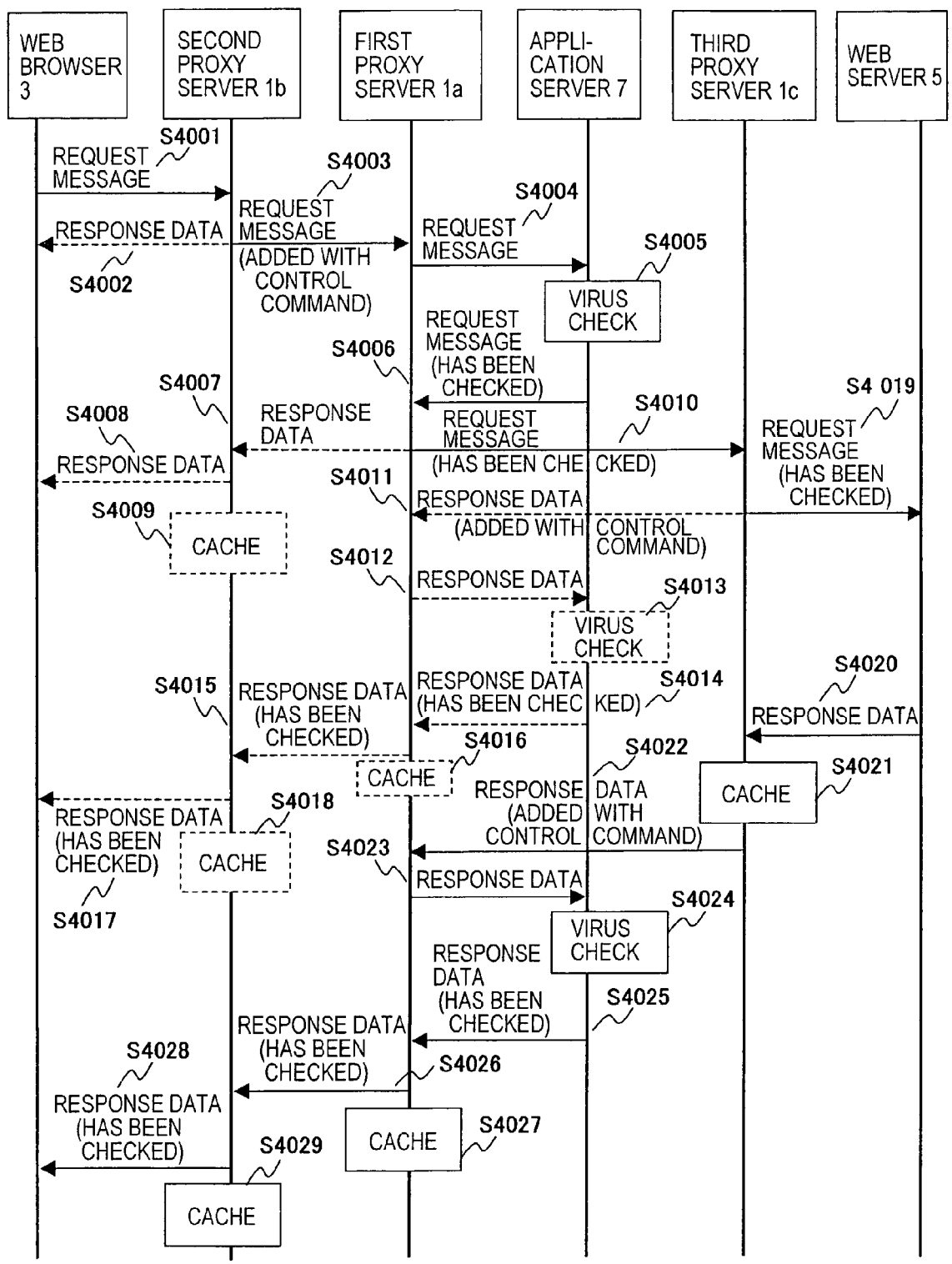
FIG. 16 illustrates an example of a flow of a request message and its response data that are exchanged on the network system shown in FIG. 1.

FIG. 16 illustrates an example of a flow of the request message and its response data that are exchanged on the network system constituted as described above.

At first, the request message transmitted from the Web browser 3 arrives at the second proxy server 1b (S4001).

The second proxy server 1b checks whether or not the Web data as the object of this request message is cached. If it is cached, the second proxy server 1b transmits the response data including this Web data to the Web browser 3 of the request message transmission source (S4002). On the other hand, if it is no cached, the second proxy server 1b adds the value added service control command for applying the virus check to this request message to this request message. Therefore, the request message added with the value added service control command is transmitted from the second proxy server 1b to the first proxy server 1a (S4003).

The first proxy server 1a separates the value added service control command from the request message received from the second proxy server 1b. Then, in accordance with the separated value added service control command, the first proxy server 1a transmits this request message to the application server 7 for the virus check (S4004). The application server 7 carries out the virus check so as to check whether or not the request message received from the first proxy server 1a tries to access the data which has been found to be infected with a virus (S4005). After that, the request message thus virus checked is returned to the first proxy server 1a (S4006).

The first proxy server 1a checks whether or not the Web data as the object of the request message thus virus checked is cached. Then, if it is cached, the first proxy server 1a transmits the response data including this Web data to the second proxy server 1b (S4007). The second proxy server 1b transmits the response data received from the first proxy server 1a to the Web browser 3 as the request message transmission source (S4008) and caches it (S4009).

On the other hand, in the case that the Web data as the object of the request message thus virus checked is not cached, the first proxy server 1a transmits this request message to the third proxy server 1c (S4010).

The third proxy server 1c checks whether or not the Web data as the object of the request message received from the first proxy server 1a is cached. If it is cached, the third proxy server 1c generates the response data including this Web data. Then, the third proxy server 1c adds the value added service control command for applying the virus check to this response data to this response data. Therefore, the response data added to the value added service control command is transmitted from the third proxy server 1c to the first proxy server 1a (S4011).

The first proxy server 1a separates the value added service control command from the response data received from the third proxy server 1c. Then, in accordance with the separated value added service control command, the first proxy server 1a transmits this response data to the application server 7 for the virus check (S4012). The application server 7 carries out the virus check to the response data received from the first proxy server 1a (S4013). After that, the response data thus virus checked is returned to the first proxy server 1a (S4014).

The first proxy server 1a transmits the response data thus virus checked to the second proxy server 1b (S4015) and caches it (S4016). The second proxy server 1b transmits the response data thus virus checked which is received from the first proxy server 1a to the Web browser 3 as the request message transmission source (S4017) and caches it (S4018).

On the other hand, in the case that the Web data as the object of the request message thus virus checked is not cached in the third proxy server 1c, the third proxy server 1c transmits this request message to the Web server 5 (S4019).

The Web server 5 generates the response data in which the Web data as the object of the request message received from the third proxy server 1c is stored and passes it to the third proxy server 1c (S4020).

The third proxy server 1c caches the response data received from the Web data 5 (S4021) and adds the value added service control command for applying the virus check to this response data to this response data. Therefore, the response data to which the value added service control command is added is returned from the third proxy server 1c to the first proxy server 1a (S4022).

The first proxy server 1a separates the value added service control command from the response data received from the third proxy server 1c. Then, based on the separated value added service control command, the first proxy server 1a transmits this response data to the application server 7 for the virus check (S4023). The application server 7 carries out the virus check for the response data received from the first proxy server 1a (S4024). After that, the response data thus virus checked is returned to the first proxy server 1a (S4025).

The first proxy server 1a transmits this response data thus virus checked to the second proxy server 1b (S4026) and caches it (S4027). The second proxy server 1b transmits the response data thus virus checked received from the first proxy server 1a to the Web browser 3 as the request message transmission source (S4028) and caches it (S4029).

As described above, an embodiment according to the present invention has been explained.

According to the present embodiment, it is possible to add the value added service control command that indicates the condition and the application server 7's service to be applied to the request message and/or its response data when it satisfies the condition.

Then, the first proxy server 1a, based on the value added service control command which is included in this request message, relays this request message to the request message transmission destination or transfers this request message to the application server 7 to make the application server 7 apply the value added service such as process, modification, conversion and check or the like then relays this request message to the request message transmission source. Alternatively, the first proxy server 1a relays the response data to the request message transmission source or transfers this response data to the application server 7 to make the application server apply the value added service such as process, modification, conversion and check or the like, then relays this response data to the request message transmission source.

Additionally, the first proxy server 1a, in accordance with the value added service control command included in the response data, relays this response data to the request message transmission source or transfers this response data to the application server 7 to make the application 7 apply the value added service such as process, modification, conversion and check or the like, then relays this response data to the request message transmission destination.

In this way, according to the present embodiment, the value added service control command is included in the request message itself and/or the response data itself. Then, according to the present embodiment, the first proxy server 1a extracts and interprets the value added service control command included in the request message and/or the response data, and judges whether or not the request message and/or the response data are to be transferred to the application server 7 for applying the value added service to them in accordance with this value added service control command.

Therefore, it is not necessary to set a table which is explained in the prior art in advance to each of many proxy servers located on the network. Further, it is possible to provide different value added services to each data dynamically generated by a CGI or the like having the same destination URL. In this way, according to the present embodiment, it is possible to control the data transfer to the application server 4 flexibly and delicately.

Additionally, according to the present embodiment, the second proxy server 1b accommodating the Web browser 3 adds the value added service control command to the request message received from the Web browser 3 to relay it to the first proxy server 1a. Therefore, it is not necessary to set up a particular mechanism (a mechanism owned by the Web browser 4) to the Web browser 3.

In the same way, according to the present embodiment, the third proxy server 1c accommodating the Web server 5 adds the value added service control command to the response data received from the Web server 5 to relay it to the first proxy server 1a. Therefore, it is not necessary to set up a particular mechanism (a mechanism owned by the Web browser 6) to the Web server 5.

The present invention is not limited to the above described embodiment and various modifications will become possible without departing from the scope thereof.

For example, according to the above described embodiment, the exchange of the request message and the response data is performed by using IP and HTTP. However, the present invention is not limited to this case. For example, exchange of the request message and the response data may be performed using IP and FTP (File Transfer Protocol).

Further, in the present invention, the object of the request message or the Web data stored in the response data is not limited to an HTML (Hypertext Markup Language) document, but a program and other file data may be included in the Web data according to the present invention.

As described above, according to the present invention, it is possible to control the data transfer to the application server connected to the proxy server apparatus.

What is claimed is:

1. A network system connected via a network to a client, a server providing Web data and a proxy server apparatus that relays the communication between the client and the server, comprising:

a first proxy server apparatus connected to the network, wherein said first proxy server comprises:

a control command interpreting unit that separates a control command from a request message from said client and manages it, when the request message has the control command which at least indicates an object of an value added service, a condition of applying the value added service and a content of a value added service, a value added service control unit that decides the control command to be applied to the request message and/or the response data among the control commands which are managed by said control command interpreting unit, transfers the request message and/or its response data to an application server which carries out the value added service in accordance with the decided control command and obtains the processed request message and/or the processed response data to which the value added service has been applied from said application server, and a request message proxy unit that receives the request message of said client to relay it to said server of the destination and receives the response data of this request message from said server to relay this to said client as the request message transmission source, wherein said request message proxy unit makes said control command interpreting unit process the request message from said client to obtain the request message which does not include the control command, makes said value added service control unit process this request message to obtain the processed request message to be relayed to said server, and makes said value added service control unit process the response data from said server to obtain the processed response data for relaying this response data to be relayed to said client;

a second proxy server apparatus that relays the communication between the client and said first proxy server apparatus, wherein said second proxy server comprises:

a control command adding unit that adds a control command which at least indicates an object of an value added service, a condition of applying the value added service and a content of the value added service to the request message from said client to be relayed to said first proxy server apparatus; and a third proxy server apparatus that relays the communication between said first proxy server apparatus and the server, wherein said third proxy server comprises:

a control command adding unit that adds a control command which at least indicates an object of an value added service, a condition of applying the value added service and a content of the value added service to the response data from said server to be relayed to said first proxy server apparatus.

2. A network system according to claim 1, wherein said control command interpreting unit of said first proxy server apparatus separates the control command from the response data from said server and manages it as the same as the control command included in the request message when the response data has the control command which at least indicates an object of an value added service, a condition of the value added service and a content of the value added service, and wherein said request message proxy unit makes said control command interpreting unit process the response data from said server to obtain the response data which does not include the control command, makes said value added service control unit process this response data to obtain the processed response data to be displayed to said client.

3. A network system according to claim 2, said first proxy server apparatus further corn prising:

a data cache unit that caches the response data which has been processed by said value added service control unit, and which is associated with the content of the value added service which is applied to said response data, wherein said request message proxy unit selects the control command to be applied to the response data and/or the request message which have been processed by said value added service control unit among the control commands which are managed by said control command interpreting unit, and further, checks whether or not the response data is cached in said data cache unit, and the caches area associated with the value added service included in said selected control command, and said request message proxy unit transmits this cached response data to said client in stead of relaying the request message, when the response data of the processed request message is cached.

4. A method for providing a service by use of proxy server apparatuses connected via a network between a client and an server providing Web data, comprising:

separating in a control command interpreting unit a control command from a request message from said client and managing it in a first proxy server apparatus connected to the network, when the request message has the control command which at least indicates an object of a value added service, a condition of applying the value added service and a content of a value added service;

deciding in a value added service control unit the control command to be applied to the request message and/or the response data among control commands which are managed by said control command interpreting unit, transferring the request message and/or its response data to an application server which carries out the value added service in accordance with the decided control command and obtaining the processed request message and/or the processed response data to which the value added service has been applied from said application server;

receiving in a request message proxy unit the request message of said client to relay it to said server of the destination and receiving the response data of this request message from said server to relay this to said client as the request message transmission source, wherein said request message proxy unit makes said control command interpreting unit process the request message from said client to obtain the request message which does not include the control command, makes said value added service control unit process this request message to obtain the processed request message to be relayed to said server, and makes said value added service control unit process the response data from said server to obtain the processed response data for relaying this response data to be relayed to said client;

adding in a second proxy server apparatus that relays the communication between the client and said first proxy server apparatus, a control command which at least indicates an object of an value added service, a condition of applying the value added service and a content of the value added service to the request message from said client to be relayed to said first proxy server apparatus; and adding in a third proxy server apparatus that relays the communication between said first proxy server apparatus and the server, a control command which at least indicates an object of an value added service, a condition of applying the value added service and a content of the value added service to the response data from said server to be relayed to said first proxy server apparatus.

5. A method according to claim 4, wherein said control command interpreting unit of said first proxy server apparatus separates the control command from the response data from said server and manages it as the same as the control command included in the request message when the response data has the control command which at least indicates an object of an value added service, a condition of the value added service and a content of the value added service, and wherein said request message proxy unit makes said control command interpreting unit process the response data from said server to obtain the response data which does not include the control command, makes said value added service control unit process this response data to obtain the processed response data to be displayed to said client.

6. A method according to claim 4, further comprising:

caching a data cache unit the response data which has been processed by said value added service control unit and which is associated with the content of the value added service which is applied to said response data; wherein said request message proxy unit selects the control command to be applied to the response data and/or the request message which have been processed by said value added service control unit among the control commands which are managed by said control command interpreting unit, and further, checks whether or not the response data is cached in said data cache unit, and the caches area associated with the value added service included in said selected control command, and said request message proxy unit transmits this cached response data to said client in stead of relaying the request message, when the response data of the processed request message is cached.

* * * * *